US011811775B2

(12) United States Patent
Hadler

(10) Patent No.: US 11,811,775 B2
(45) Date of Patent: *Nov. 7, 2023

(54) SYSTEM AND METHOD FOR HANDLING USER REQUESTS FOR WEB SERVICES

(71) Applicant: Charles Schwab & Co., Inc., Westlake, TX (US)

(72) Inventor: Steven Hadler, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,987

(22) Filed: Apr. 5, 2022

(65) Prior Publication Data

US 2022/0303275 A1      Sep. 22, 2022

Related U.S. Application Data

(63) Continuation of application No. 16/865,422, filed on May 4, 2020, now Pat. No. 11,297,060, which is a continuation of application No. 15/860,605, filed on Jan. 2, 2018, now Pat. No. 10,645,086.

(60) Provisional application No. 62/441,138, filed on Dec. 30, 2016.

(51) Int. Cl.
*H04L 9/40* (2022.01)

(52) U.S. Cl.
CPC .......... *H04L 63/101* (2013.01); *H04L 63/083* (2013.01)

(58) Field of Classification Search
CPC ........................... H04L 63/101; H04L 63/083
See application file for complete search history.

(56) References Cited

U.S. PATENT DOCUMENTS

| 8,332,430 | B2* | 12/2012 | Koide | H04L 63/0815 |
| | | | | 707/711 |
| 8,707,451 | B2* | 4/2014 | Ture | G06F 21/6218 |
| | | | | 726/28 |
| 8,806,591 | B2* | 8/2014 | Dallas | G06F 21/46 |
| | | | | 726/22 |
| 8,918,854 | B1* | 12/2014 | Giobbi | G02B 6/0038 |
| | | | | 726/9 |
| 9,148,424 | B1* | 9/2015 | Yang | H04L 63/083 |
| 9,185,125 | B2* | 11/2015 | Varsanyi | G06F 21/552 |
| 9,660,974 | B2* | 5/2017 | Grajek | H04L 67/563 |
| 9,971,894 | B2* | 5/2018 | Shear | G06F 21/31 |
| 10,250,583 | B2* | 4/2019 | Caldera | H04L 63/0876 |
| 10,284,595 | B2* | 5/2019 | Reddy | H04L 63/1416 |
| 2012/0180124 | A1* | 7/2012 | Dallas | G06F 21/46 |
| | | | | 726/22 |
| 2012/0323786 | A1* | 12/2012 | Kirsch | G06F 21/6245 |
| | | | | 705/44 |
| 2015/0254452 | A1* | 9/2015 | Kohlenberg | G06F 21/45 |
| | | | | 726/6 |
| 2015/0379266 | A1* | 12/2015 | McLaughlin | H04L 63/14 |
| | | | | 726/23 |
| 2017/0004582 | A1* | 1/2017 | Engström | G06Q 40/03 |
| 2017/0070527 | A1* | 3/2017 | Bailey | H04L 67/02 |

(Continued)

*Primary Examiner* — Stephen T Gundry
(74) *Attorney, Agent, or Firm* — Harness, Dickey & Pierce, P.L.C.

(57) ABSTRACT

A system and method detects and handles replay attacks using counters maintained for each of several different periods for various values of IP addresses and browser description attributes encountered.

21 Claims, 5 Drawing Sheets

(56) References Cited

U.S. PATENT DOCUMENTS

| | | | |
|---|---|---|---|
| 2017/0208075 A1* | 7/2017 | Kerametlian | H04L 63/205 |
| 2017/0237746 A1* | 8/2017 | Mehr | B65D 83/207 |
| | | | 726/22 |
| 2017/0244694 A1* | 8/2017 | Roth | G06F 21/45 |
| 2018/0124033 A1* | 5/2018 | Greenspan | G06F 21/31 |
| 2020/0137033 A1* | 4/2020 | Maxwell | G06F 21/45 |

* cited by examiner

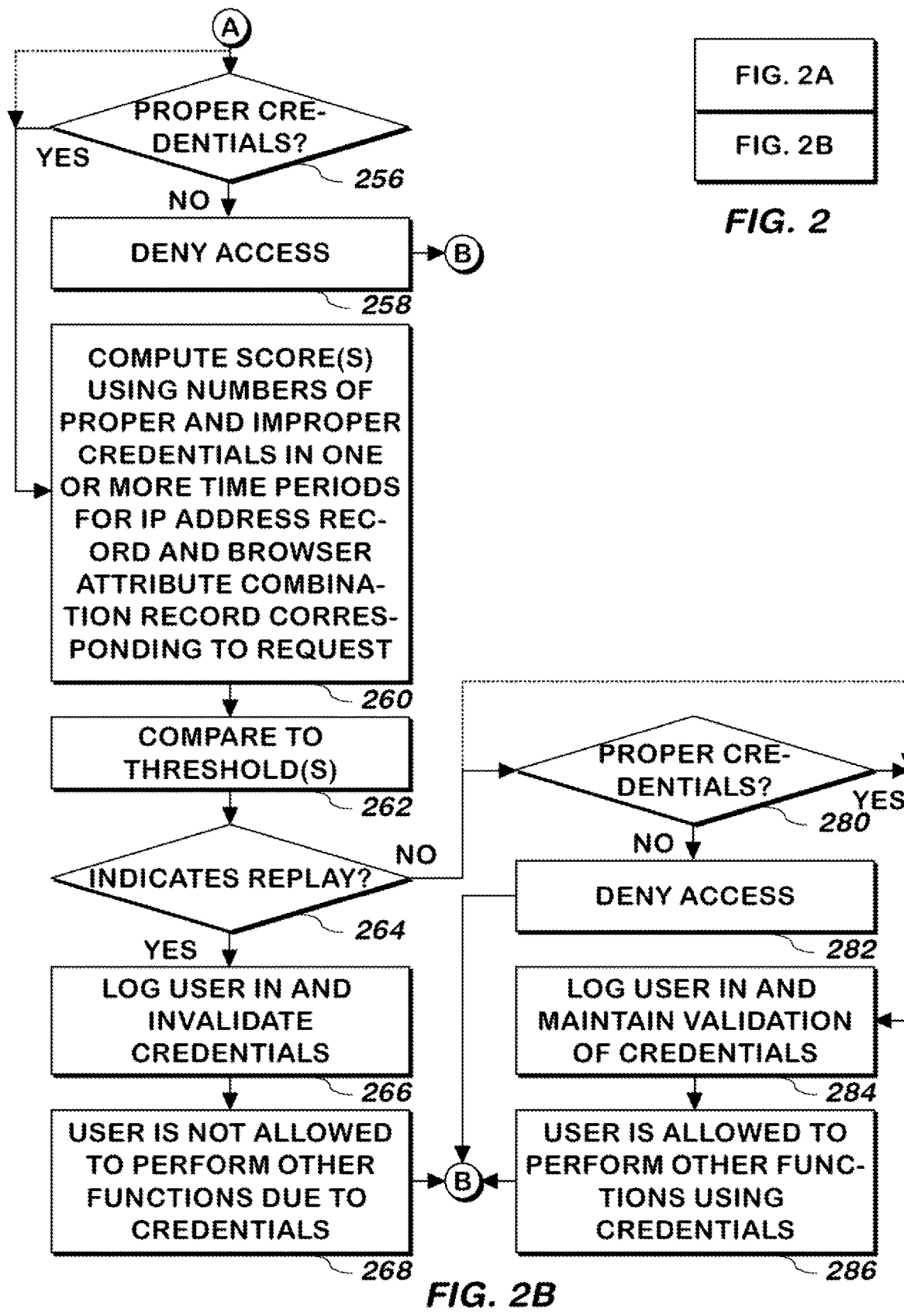

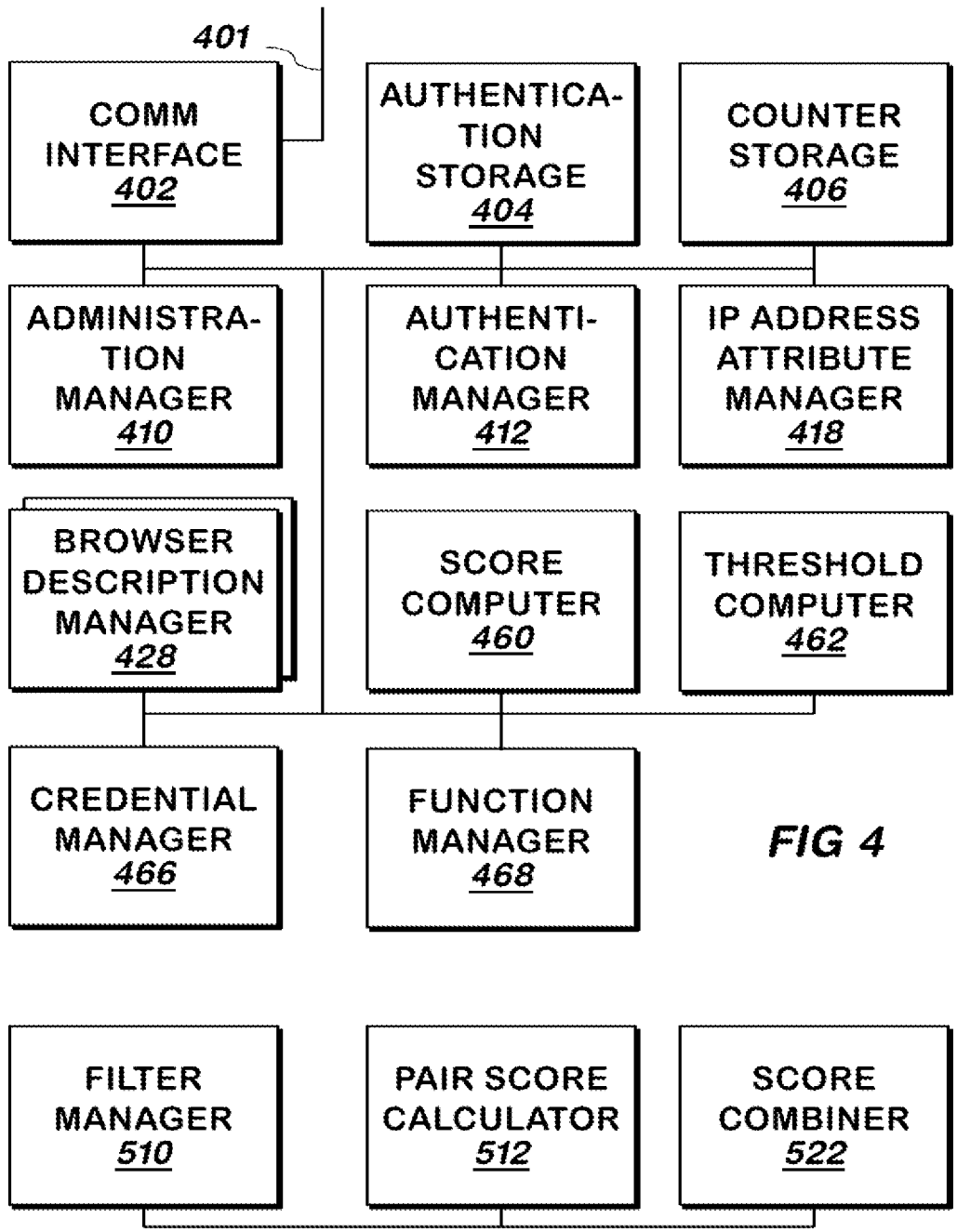

SYSTEM AND METHOD FOR HANDLING USER REQUESTS FOR WEB SERVICES

CROSS REFERENCE TO RELATED APPLICATIONS

This application is a continuation of U.S. patent application Ser. No. 16/865,422 entitled, "System and Method for Handling User Requests for Web Services" filed by Steven Hadler on May 4, 2020, which is a continuation of U.S. patent application Ser. No. 15/860,605 entitled, "System and Method for Handling User Requests for Web Services" filed by Steven Hadler on Jan. 2, 2018, which claims the benefit of U.S. Provisional Patent Application Ser. No. 62/441,138 entitled "Method and Apparatus for Handling User Requests for Web Services" filed by Steven Hadler on Dec. 30, 2016, having the same assignee as the present invention and each is hereby incorporated by reference in its entirety.

FIELD OF THE INVENTION

The present invention is related to computer hardware and software and more specifically to computer software for handing user requests for web services.

BACKGROUND OF THE INVENTION

Replay attacks are attacks from a malicious party who has stolen credentials from one website, and attempts to re-use those credentials on another website, figuring some of the people will use the same credentials from one website to the next.

Replay attacks are particularly difficult to identify because they can be distributed to come from a large number of otherwise legitimate computer systems that have been conscripted, part time, for the attacker's nefarious purposes, and because, in some cases, the credentials used in the attack are valid credentials for the web site under attack.

Current approaches to detect replay attacks are insufficient. What is needed is a better system and method for detecting and handling replay attacks.

SUMMARY OF INVENTION

A system and method increments multiple counters in response to a login request or other request for a web service, after determining whether the authentication using information sent with the request was successful or unsuccessful. At least one counter is used for each of several categories, the categories corresponding to the IP address of the request, and the value of each of one or more browser description attributes the browser adds to the request. Within each category are several periods, such as an individual hour, day, week or month. There may be multiple counters per period within each category, such as one counter for each authentication type: e.g. successful or unsuccessful. All counters applicable to the request are incremented: for example, if there are counters for a day and a week, and the request is successful, the "successful" counter applicable to the IP address for the day and the successful counter applicable to the IP address for the week are both incremented, in addition to other applicable counters.

The value of the counters are used in a formula to generate a score, and the score is compared with a threshold that indicates when a request is likely to be part of a replay attack. If the score indicates the request is not part of a replay attack, the user is logged in with valid credentials. The credentials are checked for other web services the user requests, and such requests will be granted due to the valid credentials.

If the score indicates that the request is likely to be part of a replay attack, the user is logged in but with invalid credentials. The log in causes the same screen to be displayed that would be displayed if the credentials were valid, which prevents an automated replay attacker from realizing that the login will not allow the user to request subsequent web services.

BRIEF DESCRIPTION OF THE DRAWINGS

FIG. 4 is a block schematic diagram of a system for detecting and handling a replay attack according to one embodiment of the present invention.

FIG. 5 is a block schematic diagram of score computer 460 of FIG. 4 shown in more detail according to one embodiment of the present invention

DETAILED DESCRIPTION OF A PREFERRED EMBODIMENT

Figure 1:
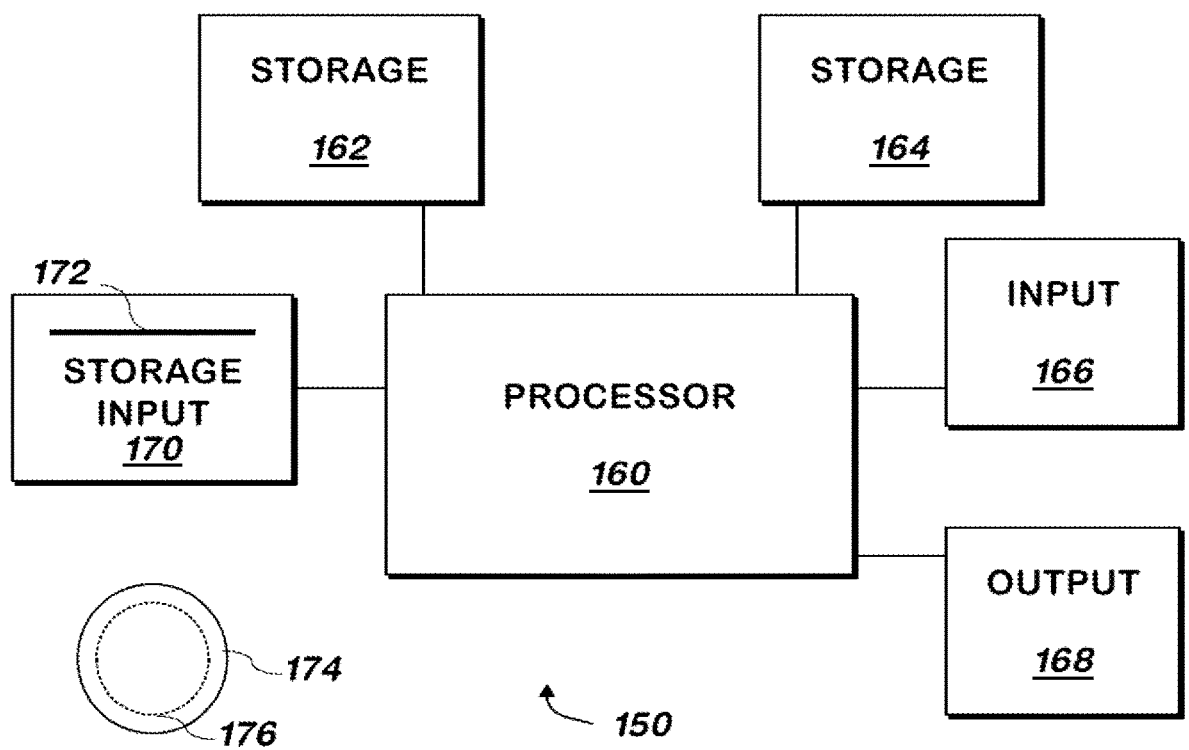
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
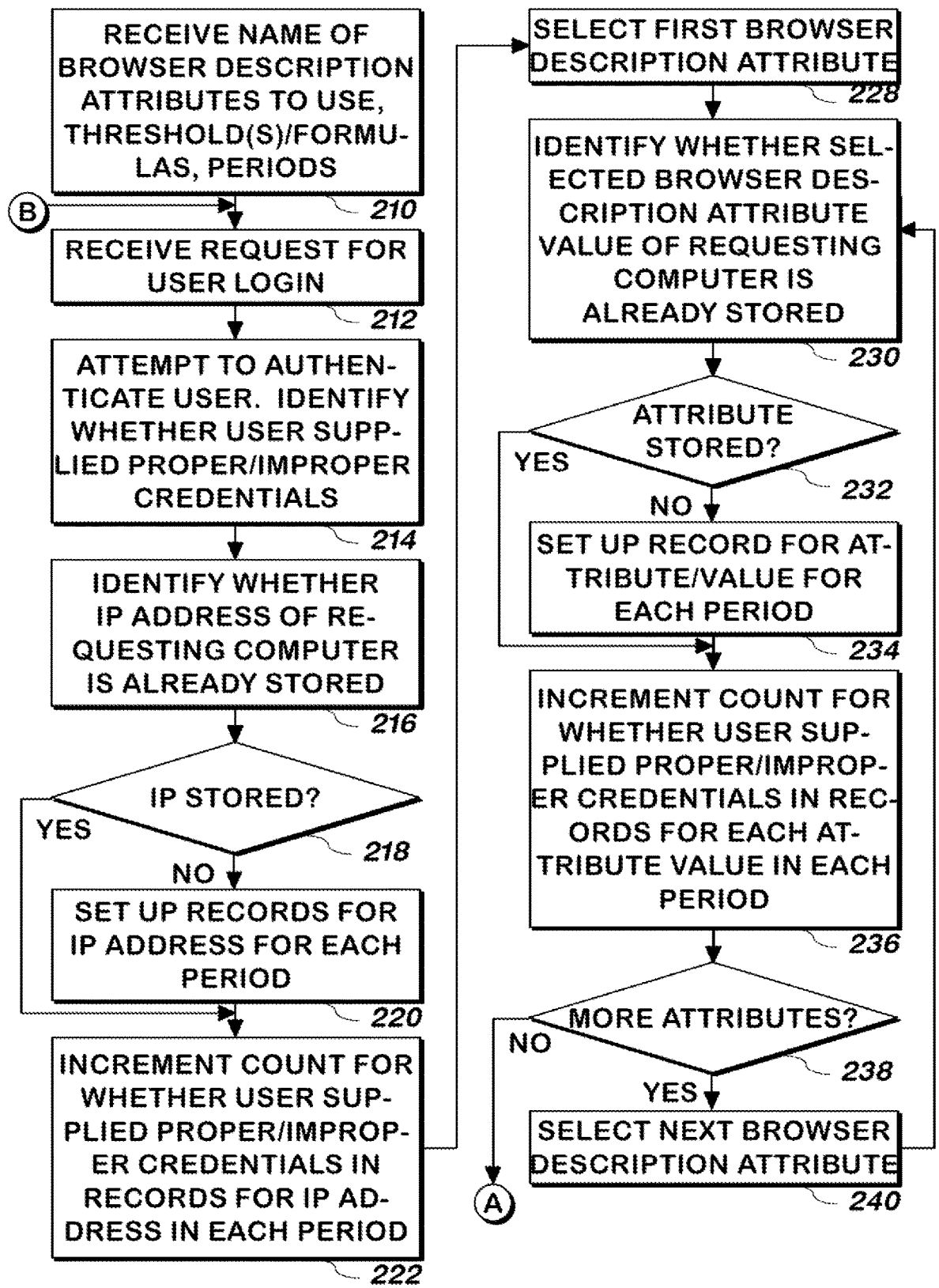
FIG. 2, consisting of FIG. 2A and FIG. 2B, is a flowchart illustrating a method of detecting and handling a replay attack according to one embodiment of the present invention.

Referring now to FIG. 2, consisting of FIGS. 2A and 2B, a method of providing access to one or more web services while filtering replay attacks is shown according to one embodiment of the present invention.

A) The name of browser description attributes to use, B) one or more periods of time to use for counters to store statistics and C) a formula to calculate a score for filtering replay attacks using counters corresponding to one or more IP addresses, the browser description attributes and periods of time are received 210. In one embodiment, the browser description attributes and periods of time to use are inferred from the formulas and are not separately received. Browser description attributes are attributes that are added to the HTTP header or other portion of a web request by the browser. Browser description attributes may include conventional user-agent, and accept-language HTTP header metadata.

A request for a web service such as a user login is received 212. The request may be any conventional request to access a web service, and may include as credentials to access the web service a user identifier and password or other conventional credentials.

An attempt is made to authenticate the user from which the request was received 214. To authenticate the user, the credentials the user supplied are checked to determine their authenticity and a determination is made as to whether the user has properly authenticated himself or herself using the credentials, and optionally other information. For example, a user and password supplied as credentials may be compared with a previously-supplied user identifier and password, and if the user identifier supplied with the request matches one previously stored, and the password matches the stored password for that user identifier, the user is determined to be properly authenticated, and otherwise, the user is determined not to be properly authenticated.

An attempt is made to determine whether one or more counters used to compute the score below (and optionally other counters) exist for the IP address from which the request was received 216. If all of the one or more counters for that IP address are in operation, 218, the method continues at step 222 and otherwise, one or more counters for that IP address are created and initialized to zero 220. In one embodiment, counters exist for an IP address for the hour, day, week, and month, though other periods may be used. Some counters may not be used in formulas, but are maintained for statistical modeling purposes, and for potential use in future formulas. In certain circumstances, some, but not all counters will exist. For example, the counter for the month may exist for that IP address, but the counter for the current week and day and hour will not exist because this is the first time the IP address has been received in a request in the current week. In such case, any counters that do not exist are created and initialized to zero.

In one embodiment, for each period, there is a counter for the user properly authenticating himself or herself and another counter for the user not properly authenticating himself or herself, or variations on this idea, such as one counter for all authentication attempts and another for successful authentication attempts. The periods are specified in step 210, either explicitly or implicitly via the formula. If other counters not used in the formula are to be maintained in the embodiment in which counters in the formula are identified from the formula as those that should be maintained, the counters not used in the formula are nevertheless explicitly specified and such counters are also maintained.

Thus, after the end of two months of operation, counters for each IP address used to attempt to log in could exist for each one hour period, each day, each week, and each month during that period in which a request was received from that IP address, one for logins in which the user properly authenticated himself and one for logins in which the user did not properly authenticate himself. Such pair of counters would also exist during each of those periods for each value of browser description attribute that was encountered during any period. If, for example, a browser description attribute value was encountered only once during the two week period, one counter for the hour, one counter for the day, one counter for the week and one counter for the month would exist, and the other counters during the other periods would not exist, in one embodiment.

The corresponding counters for each period corresponding to the current date and time, the IP address or browser description attribute of the request, and whether or not the user was properly authenticated, are incremented 222. This may mean incrementing more than one counter for each period, or incrementing one counter per period.

The first browser description attribute from among those implicitly or explicitly received in step 210 is selected and the value of such browser description attribute received in conjunction with the request is identified 228. A determination is made as to whether each of the periods specified in step 210 have one or more counters for that value of the selected browser description attribute 230. If all such periods have the requisite number of counters as described above 232, the method continues at step 236 and otherwise, the missing counters for such value are initialized to zero as described above 234.

The counters corresponding to the browser description attribute value in each period are incremented, in accordance with the success of the authentication attempt of step 214, and if there are more browser description attributes from among those received in step 210 238, the next such browser description attribute is selected 240 and the method continues at step 230 using the newly selected browser description attribute, and otherwise 238, the method continues at step 256 or 260 of FIG. 2B.

At step 256, if the request for the user login or other web service did not supply the proper credentials, the user is denied access 258 and the method continues at step 212, and otherwise 256, the method continues at step 260. As noted, steps 256 and 258 are omitted, in one embodiment.

At step 260, a score is computed 260 using the counters, and the formula received at step 210. Values that may be part of the formula include current and past counters that correspond to the IP address or browser description attribute values received in conjunction with the request, along with the authentication status of the user or the opposite status, and median or mean values of certain counters, either including or excluding those corresponding to the request. Mathematical operators and constants may also be part of the formula. The formula may be written to specify the current counters or past counters, the value of the IP address or browser description attribute received with the request or other ones, the authentication status of the user who provided the request, and so on.

Figure 3:
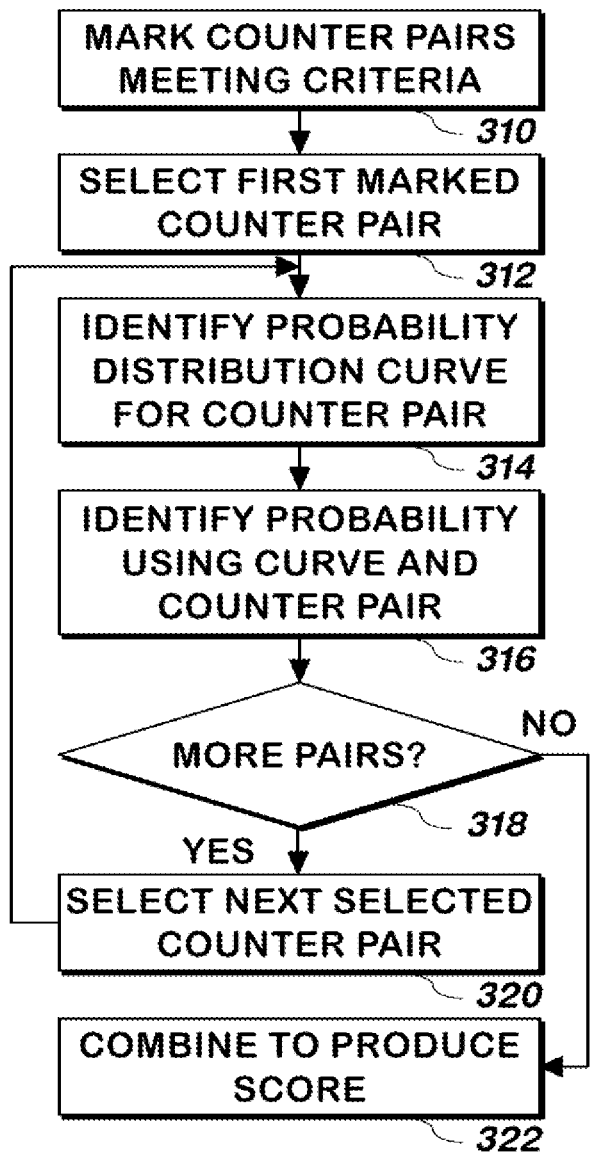
FIG. 3 is a flowchart illustrating a method of computing a score using each of the counter pairs from the periods and attributes corresponding to a request to log in according to one embodiment of the present invention.

FIG. 3 is a flowchart illustrating a method of computing a score using each of the counter pairs from the periods and attributes as described above. Referring now to FIG. 3, the counter pairs corresponding to approximately the current date and time and to the IP address and browser description attributes of the entity attempting to log in, optionally meeting a criteria, are marked for use in calculating the score that will be used to determine whether the login attempt using proper credentials is a replay attack.

The criteria may be any of a number of criteria. For example, a counter pair for the current day and a counter pair for the current hour, for each of a browser attribute description value and IP address corresponding to the log in attempt for counter pairs having a total count or one count of the pair that is significantly above twice that of its historical median or average may be marked to influence the score in one embodiment. In another embodiment, counter pairs for the current hour and day for each of an IP address or browser description attribute value corresponding to the login attempt whose value has increased relative to its historical average more than the increase above the historical average for counter values corresponding to other IP addresses or other browser description attribute values are marked to influence the score. The historical median may be identified by using the corresponding (i.e. same attribute value and/or IP address as those from the attempt to log in) counter having a longer period, such as a month, and then dividing by the number of smaller periods in the longer period to identify its historical average.

In one embodiment, only the counter pairs that indicate the number of failures (login credentials failed) are at least a configurable multiple of the successes (login credentials succeeded) are marked to use to calculate the score, from among the counters that apply to the current date and time and the IP address and browser description attributes corresponding to the request to log in. In one embodiment, the number is 10, though other embodiments use other numbers. The number (or other criteria) may be selected to provide a desired percentage or number of false positives, false negatives, or both, as indicated by historical data. If the number of successful attempts is zero for a counter pair, a counter pair may be used to calculate a score if the number of failed attempts exceeds a threshold, such as 10 or 100.

In one embodiment, the marked counter pairs are the only counter pairs used to influence the score and in another embodiment, the marked counter pairs have a significantly greater influence over the score than the unmarked counter pairs that also correspond to the current or near current date and time (as of the log in attempt), IP address and browser description attribute values of the log in attempt. The former approach will be used for the remainder of the discussion.

A first one of the counter pairs marked is selected 312 and a probability that the login is part of a replay attack is identified, in one embodiment by calculating a probability distribution curve for the selected counter pair 314 and then identifying the probability for that counter pair 316.

In one embodiment, one plus each counter in the selected counter pair (i.e. as if each counter in the pair were incremented) are used as the parameters for a beta distribution (using the number of failures as the alpha parameter in one embodiment, or the beta parameter in another embodiment), and the resulting probability density function is then identified. A point (e.g. 0.1) on the X axis of the function is selected, and the area under the function from zero to the point is identified or approximated using conventional integration approximation techniques and used as the probability that the counter indicates a malicious attempt, optionally considering the total area under the probability function for all values equal to one.

If there are more marked counter pairs 318, the next marked counter pair is selected 320 and the method continues at step 314 using the newly selected counter pair, and otherwise 318, the method continues at step 322.

At step 322, the resulting probabilities from each applicable counter pair may be combined into a score by weighting (i.e. multiplying the probability by a weight) and summing, and dividing the result by the number of counters used, the sum of the weights, or another number, to produce the score, or by converting each one to a Boolean zero (if the probability is below a threshold value) or a one (if the probability is at or above the threshold value) and then combining them using AND and/or OR logic functions or weighting and summing, with the function, weights, and parameters (e.g. the threshold values) identified to provide a desired measure of false positives and/or false negatives using historical data and conventional regression analysis techniques.

The actual formula and/or weights used to compute the score may be identified using conventional regression analysis techniques on historical data (IP addresses and browser description attributes for different period sizes, and a determination of whether the request was from a replay attack or not) that cause the score to rise above a threshold value when a replay attack is received (i.e. a malicious party has obtained real credentials from a user who is not the malicious party and is testing such credentials and those of other users and non users, for example, credentials that have been stolen from another supplier of web services other than then one for which the malicious user is testing the credentials) for at least a first percentage of replay attacks, and that causes false positives (the score is above the threshold when the request is not part of a replay attack) not higher than a second percentage of all requests for log ins or other web services.

Referring again to FIG. 2B, if the score is above the threshold that indicates a replay attack 264, the user from which the request was received is logged in 266, but the user's credentials are invalidated 268, so that the user will not be able to receive some or all additional web services.

If the score is not above the threshold that indicates the request is a replay attack 264, in the embodiment in which steps 256 and 258 were not skipped, the method continues at step 284. In the embodiment in which steps 256 and 258 were skipped, if the score is not above the threshold 264, the method continues at step 280.

At step 280, if the credentials supplied by the user in step 212 were not valid 280, access to the requested web service is not provided, the user is not logged in and the user may receive an error message 282. Otherwise 280, the user is logged in with valid credentials 284 and receives the requested web service and optionally any other web services the user credentials authorize 286.

Additional Embodiments

In one embodiment, when the user's credentials are invalidated, the score is used to identify the type of response the user will receive for other web services. If the score is above the threshold to indicate a replay attack and below a second threshold, the method proceeds as described above. If the score is above the threshold and above a second, higher threshold, indicating a high degree of confidence that the request is part of a replay attack, some other web services may be provided using false data, along with a random image that informs the user that the data is false.

In one embodiment, additional counters are maintained for each period and IP address and/or browser attribute combination. The additional counters for each period corresponding to the current period are incremented at step 222 and 236 if the user identifier did not match any user identifier for a valid user, and/or other counters for each period are maintained that count the number of times an incorrect password was used for a user identifier that was retried with the correct password within a threshold period of time for the same user identifier. Such counters may also be used in the formula in the same manners as the other counters described above.

System

Referring now to FIG. 4, a system for authenticating users is shown according to one embodiment of the present invention.

Communication interface 402 is a conventional TCP/IP-compatible communication interface running suitable communication protocols such as TCP/IP, Ethernet, and other communication protocols. Input/output 401 is coupled to a network such as an Ethernet network that is coupled to the networks of the Internet. All communication into and out of the system of FIG. 4 is made via communication interface 402 unless otherwise specified.

Authentication storage 404 and counter storage 406 include conventional computer memory or disk storage and may include a conventional database. The remaining elements of FIG. 4 (and FIG. 5) may be implemented with one or more conventional hardware computer processors running a stored computer program, or via dedicated circuitry that operates as described herein. The remaining elements are all structural elements of a digital processing system. All elements of FIGS. 4 and 5 contain inputs, outputs, and/or input/outputs and are coupled to the other elements as described herein.

Administration manager 410 receives the names of browser description attributes to use to score entities attempting to log in, thresholds, formulas, period sizes and other information received as described herein, and stores such information into authentication storage 404. Authentication storage 404 also holds the user names and passwords for all valid user accounts, such information having been received and stored therein by administration manager 410.

Authentication manager 412 receives requests for logins, including a user identifier and password supplied by the "user" (which may be a bot) attempting to log in, authenticates the request by locating in authentication storage 404 a user identifier matching the one supplied in the request and matching the password supplied in the request with the password stored in authentication storage 404 that is associated with the user identifier located. If both are located and match, the user is determined to have been positively authenticated by authentication manager 412. Otherwise, the user is determined not to be positively identified. As used herein, the "user" is an entity attempting to authenticate himself or herself, and may not be the actual user that the entity is representing itself to be.

Authentication manager 412 then builds an authentication object containing the date and time retrieved from an operating system or time server, an indicator as to whether the user was positively authenticated, the credentials used to log in, the IP address from which the request was received (from the request) and the values of the browser description attributes corresponding to those stored in authentication storage 404. Authentication manager 412 supplies copies of the authentication object to IP address attribute manager 416 and to each of several browser description attribute managers 428, one for each browser description attribute in authentication storage 404.

IP address attribute manager 416 checks to see that pairs of counters exist for the IP address in the authentication object for each of the periods specified in authentication storage 404 and the date and time in the authentication object, and adds a pair of any such counters that don't exist, then increments the counter in each pair (either existing or newly added) corresponding to the IP address in the authentication object for each period corresponding to the date and time in the authentication object corresponding to the indicator in the authentication object. IP address attribute manager 416 signals authentication manager 412 when it completes such operation.

Browser description managers 428 each handle an assigned one of the browser description attributes in authentication storage 404 and increment the counter in each pair for each period specified in authentication storage that is applicable to the date and time in the authentication object according to the indicator in the authentication object they receive, creating the counter pair for any such period if it doesn't exist, and signal authentication manager 412.

When it receives the signals from IP address attribute manager 416 and all of the browser description attribute managers 428, in one embodiment, authentication manager 412 then denies access to the user attempting to log in if the indication in the authentication object indicates the user was not positively authenticated (i.e. user identifier did not match one of those stored in authentication storage 404 or password was incorrect for such user identifier). Denial of access may be made using any manner described herein. If the authentication object indicates the user was positively authenticated authentication manager 412 provides the authentication object to score computer 460. In another embodiment, authentication manager 412 provides the authentication object to score manager 460 after receiving all of the signals, regardless of the state of the indicator of the authentication status.

When it receives the authentication object, score computer 460 computes as described above the scores using the counter pairs in counter storage 406 corresponding to the IP address and the values of the browser description attributes in the authentication object for each of the periods specified in authentication storage 404 corresponding to the date and time in the authentication object, combines the scores into an overall score as described above, adds the overall score to the authentication object and provides the authentication object to threshold computer 462.

FIG. 5 shows score computer 460 of FIG. 4 in more detail according to one embodiment of the present invention. Referring now to FIGS. 4 and 5, filter manager 510 receives the IP address and browser description attributes received by the entity attempting to log in, marks the corresponding counter pairs in counter storage 406 that correspond to the current time period and that meet a criteria, such that described above, and signals pair score manager 512.

When it receives the signal, pair score manager 522 uses the counters in each pair marked to compute a score for the pair as described above, and provides the pairs of scores to score combiner 522, which combines them as described above, outputs the overall score, and signals filter manager 510, which unmarks the counter pairs it marked as described above.

Referring again to FIG. 4, when it receives the authentication object, threshold computer 462 compares the overall score in the authentication object to a threshold and if the comparison indicates the attempt is a replay attack (because the overall score is above the threshold in one embodiment, or below it in another), it logs the user in, but invalidates in authentication storage 404 the credentials in the authentication object, for example, by marking them as invalid in authentication storage 404. Logging in the user includes displaying a page that indicates that the user is logged in, along with links the user can use to try to perform functions. When the user clicks the links, they signal function manager 468, which checks the credentials of the account to which the user was logged in. The account may be identified by a cookie added by credential manager 466 that is read by function manager 468 or by the user's IP address that is recorded in authentication storage by credential manager 466 associated with the user identifier stored there.

If the user credentials in authentication storage 404 are valid, function manager 468 performs the indicated function for the user and otherwise does not.

Certain Embodiments

A method of invalidating credentials is described, including: receiving a user identifier from the entity; receiving a password from the entity; receiving an IP address from the entity; receiving two or more browser attribute values from the entity; determining whether the user identifier and password received match a valid user identifier and password; responsive to the user identifier and password received matching a valid user identifier and password for corresponding to the valid user identifier, incrementing a first one of each of at least one pair of counters for each of the two or more browser attribute values and the IP address, the counters all corresponding to a period corresponding to a date and time substantially equal to a date and time at which the user identifier and password were received; responsive to the user identifier and password received not matching a valid user identifier or matching a valid user identifier but not matching a password for corresponding to the valid user identifier, incrementing a second one of each of at least one pair of counters for each of the two or more browser attribute values and the IP address, the counters all corresponding to a period corresponding to a date and time substantially equal to a date and time at which the user identifier and password were received; computing a score for each of the at least one pair of counters for the IP address received and each of the two or more browser attribute values received, the score computed using both counters in each said pair; combining the scores computed to produce a combined score; comparing the combined score to a threshold; and responsive to the comparing step, invalidating credentials associated with the user identifier received.

The method may additionally include providing a web page that would be shown to the entity if the credentials associated with the user identifier had not been invalidated.

The method may include an optional feature whereby the at least one pair of counters for each of the two or more browser attribute values and the IP address comprise two or more pairs of counters for each of the two or more browser attribute values and the IP address.

The method may include an optional feature whereby for each of the two or more browser attribute values and the IP address, each of the two or more pairs of counters corresponds to a different period size.

The method may include an optional feature whereby each score is computed by integrating an area under a curve representing a function.

The method may include an optional feature whereby the function uses both of the counters in a pair to produce the curve.

The method may include an optional feature whereby the function comprises a beta distribution.

A system for invalidating credentials in response to a request is described, including:

an authentication manager having an input for receiving from the entity the request including a user identifier, a password, an IP address and two or more browser attribute values, the authentication manager for retrieving at an input/output a substantially current date and time, and for determining whether the user identifier and password received match a valid user identifier and password, and for providing at an output an indication having a first state or a second state responsive to the determining, the IP address, plurality of browser attribute values, user identifier and the substantially current date and time;

an IP address attribute manager having an input coupled to the authentication manager output for receiving the IP address, the indication and the substantially current date and time, the IP address attribute manager for:

responsive to the indication having a first state, incrementing via an input/output a first one of each of at least one pair of counters for the IP address, the counters all corresponding to a period corresponding to the substantially current date and time, responsive to the indication having a second state, incrementing via an input/output a second one of each of at least one pair of counters for the IP address, the counters all corresponding to a period corresponding to the substantially current date and time;

two or more browser description managers, each having an input coupled to the authentication manager output for receiving a different one of the browser attribute values, the indication and the substantially current date and time, each of the browser description managers for:

responsive to the indication having a first state, incrementing via an input/output a first one of each of at least one pair of counters for the one of the two or more browser attribute value received at the respective browser description manager input, the counters all corresponding to a period corresponding to the substantially current date and time, responsive to the indication having a second state, incrementing via an input/output a second one of each of at least one pair of counters for the one of the two or more browser attribute value received at the respective browser description manager input, the counters all corresponding to a period corresponding to the substantially current date and time;

a score computer having an input coupled to the IP address attribute manager input/output for receiving the values of the counter pairs having a counter incremented and coupled to all of the browser description manager input/outputs for receiving the values of the counter pairs having a counter incremented, the score computer for computing and providing at an output a score for each of the counter pairs whose values were received at the score computer input and for combining the scores computed to produce a combined score;

a threshold computer having an input coupled to the score computer output for receiving the combined score, the threshold computer for comparing the combined score to a threshold and for providing at an output a comparison indicator having a first state and a second state responsive to the comparing by the threshold computer; and a credential manager having an input coupled to the threshold computer for receiving the comparison indicator and to the authentication manager output for receiving the user identifier, the credential manager for invalidating via an input/output credentials associated with the user identifier, responsive to the comparison indicator having the first state.

The system may include an optional feature whereby the credential manager is additionally for providing at an output a web page that would be shown to the entity if the credentials associated with the user identifier had not been invalidated, regardless of the comparison indicator.

The system may include an optional feature whereby the at least one pair of counters for each of the two or more browser attribute values and the IP address comprise two or more pairs of counters for each of the two or more browser attribute values and the IP address.

The system may include an optional feature whereby for each of the two or more browser attribute values and the IP address, each of the two or more pairs of counters corresponds to a different period size.

The system may include an optional feature whereby each score is computed by the score computer by integrating an area under a curve representing a function.

The system may include an optional feature whereby the function uses both of the counters in a pair to produce the curve.

The system may include an optional feature whereby the function comprises a beta distribution.

A computer program product including a nontransitory computer useable medium having computer readable program code embodied therein for invalidating credentials is described, the computer program product including computer readable program code devices configured to cause a computer system to:

receive a user identifier from the entity;
receive a password from the entity;
receive an IP address from the entity;
receive two or more browser attribute values from the entity;
determine whether the user identifier and password received match a valid user identifier and password;

responsive to the user identifier and password received matching a valid user identifier and password for corresponding to the valid user identifier, incrementing a first one of each of at least one pair of counters for each of the two or more browser attribute values and the IP address, the counters all corresponding to a period corresponding to a date and time substantially equal to a date and time at which the user identifier and password were received;

responsive to the user identifier and password received not matching a valid user identifier or matching a valid user identifier but not matching a password for corresponding to the valid user identifier, incrementing a second one of each of at least one pair of counters for each of the two or more browser attribute values and the IP address, the counters all corresponding to a period corresponding to a date and time substantially equal to a date and time at which the user identifier and password were received;

compute a score for each of the at least one pair of counters for the IP address received and each of the two or more browser attribute values received, the score computed using both counters in each said pair;

combine the scores computed to produce a combined score;

compare the combined score to a threshold; and responsive to the comparing step, invalidate credentials associated with the user identifier received.

The computer program product may additionally include computer readable program code devices configured to cause the computer system to provide a web page that would be shown to the entity if the credentials associated with the user identifier had not been invalidated.

The computer program product may include an optional feature whereby the at least one pair of counters for each of the two or more browser attribute values and the IP address comprise two or more pairs of counters for each of the two or more browser attribute values and the IP address.

The computer program product may include an optional feature whereby for each of the two or more browser attribute values and the IP address, each of the two or more pairs of counters corresponds to a different period size.

The computer program product may include an optional feature whereby each score is computed by integrating an area under a curve representing a function.

The computer program product may include an optional feature whereby the function uses both of the counters in a pair to produce the curve.

The computer program product may include an optional feature whereby the function comprises a beta distribution.

What is claimed is:

1. A method of invalidating credentials, comprising:
   receiving a user identifier from an entity;
   receiving a password from the entity;
   receiving a plurality of browser attribute values from the entity;
   determining whether the user identifier and password received match a valid user identifier and password;
   responsive to the user identifier and password received matching the valid user identifier and password corresponding to the valid user identifier, recording a first indication of occurrence of the matching, at least one time, for each of the plurality of browser attribute values, the recordings corresponding to at least one period corresponding to a date and time substantially equal to a date and time at which the user identifier and password were received;
   responsive to the user identifier received not matching the valid user identifier or the user identifier and password received matching a valid user identifier but not matching a password corresponding to the valid user identifier, recording a second indication of occurrence of the not matching or the matching and not matching, at least one time, for each of the plurality of browser attribute values, the recordings all corresponding to the at least one period corresponding to the date and time substantially equal to the date and time at which the user identifier and password were received;

computing at least one score for each of the plurality of browser attribute values received, the at least one score computed using the recordings of the first indication of occurrences and the indications of second occurrences for each of the browser attribute values;

combining the scores computed to produce a combined score;

comparing the combined score to a threshold; and responsive to results of the comparing, invalidating the credentials associated with the user identifier received.

2. The method of claim 1, further comprising:
providing a web page having at least a format of one that would be shown to the entity if the credentials associated with the user identifier had not been invalidated.

3. The method of claim 1, wherein:
the at least one time the first indication of occurrence is recorded comprises a plurality of times; and
the at least one time the second indication of occurrence is recorded comprises a plurality of times.

4. The method of claim 3, wherein:
the at least one period comprises a plurality of periods, each having a different size; and
each of the plurality of times corresponds to a different period size.

5. The method of claim 1 wherein each of the at least one score is computed by integrating an area under a curve representing a function.

6. The method of claim 5 wherein the function is configured to use the recordings of both of the first indications of occurrences and the second indications of occurrences to produce the curve.

7. The method of claim 6 wherein the function comprises a beta distribution.

8. A system for invalidating credentials in response to a request, comprising:
a memory having computer readable instructions stored thereon; and
at least one processor configured to execute the computer readable instructions to cause the system to perform,
receiving from an entity a request, the request comprising a user identifier, a password, and a plurality of browser attribute values,
retrieving a substantially current date and time,
determining whether the user identifier and password received match a valid user identifier and password,
providing an indication having a first state or a second state responsive to results of the determining, the providing including additionally providing the plurality of browser attribute values, the user identifier and the substantially current date and time;
responsive to the indication having the first state, recording a first indication of occurrence of the indication having the first state, at least one time, for the one of the plurality of browser attribute value, the recordings all corresponding to a period corresponding to the substantially current date and time,
responsive to the indication having the second state, recording a second indication of occurrence of the received indication, having the second state, at least one time, for the one of the plurality of browser attribute value, the recordings all corresponding to the period corresponding to the substantially current date and time,
computing a plurality of scores using the detected first indications and second indications,
combining the plurality of scores computed to produce a combined score,
comparing the combined score to a threshold,
providing a comparison indicator having a first state and a second state responsive to results of the comparing, and
invalidating credentials associated with the user identifier, responsive to results of the comparison indicator having the first state.

9. The system of claim 8, wherein the system is further caused to perform:
providing at an output a web page having at least a format of one that would be shown to the entity if the credentials associated with the user identifier had not been invalidated, regardless of the comparison indicator.

10. The system of claim 8, wherein the at least one time for the one of the plurality of browser attribute values comprise a plurality of times for each of the plurality of browser attribute values.

11. The system of claim 10, wherein for each of the plurality of browser attribute values, each of the times corresponds to a different period size.

12. The system of claim 8 wherein each score is computed by the score computer by integrating an area under a curve representing a function.

13. The system of claim 12 wherein the function uses the first indications, second indications, third indications and fourth indications to produce the curve.

14. The system of claim 13 wherein the function comprises a beta distribution.

15. A non-transitory computer useable medium having computer readable program code stored thereon, the computer readable program code configured to cause a computer system to:
receive a user identifier from an entity;
receive a password from the entity;
receive a plurality of browser attribute values from the entity;
determine whether the user identifier and password received match a valid user identifier and password;
responsive to the user identifier and password received matching the valid user identifier and password corresponding to the valid user identifier, record a first indication of occurrence of the matching, at least one time, for each of the plurality of browser attribute values, the recordings corresponding to at least one period corresponding to a date and time substantially equal to a date and time at which the user identifier and password were received;
responsive to the user identifier received not matching the valid user identifier or the user identifier and password received matching a valid user identifier but not matching a password corresponding to the valid user identifier, record a second indication of occurrence of the not matching or the matching and not matching, at least one time, for each of the plurality of browser attribute values, the recordings all corresponding to the at least one period corresponding to the date and time substantially equal to the date and time at which the user identifier and password were received;

compute at least one score for each of the plurality of browser attribute values received, the at least one score computed using the recordings of the first indication of occurrences and the indications of second occurrences for each of the browser attribute values;

combine the scores computed to produce a combined score;

compare the combined score to a threshold; and responsive to results of the comparing, invalidate credentials associated with the user identifier received.

16. The non-transitory computer useable medium of claim 15, wherein the computer readable program code is further configured to cause the computer system to provide a web page having at least a format of one that would be shown to the entity if the credentials associated with the user identifier had not been invalidated.

17. The non-transitory computer useable medium of claim 15, wherein:

the at least one time the first indication of occurrence is recorded comprises a plurality of times; and the at least one time the second indication of occurrence is recorded comprises a plurality of times.

18. The non transitory computer useable medium of claim 17, wherein:

the at least one period comprises a plurality of periods, each having a different size; and each of the plurality of times corresponds to a different period size.

19. The non-transitory computer useable medium of claim 15 wherein each of the at least one score is computed by integrating an area under a curve representing a function.

20. The non-transitory computer useable medium of claim 19 wherein the function uses the recordings of both of the first indications of occurrences and the second indications of occurrences to produce the curve.

21. The non-transitory computer useable medium of claim 20 wherein the function comprises a beta distribution.

* * * * *